United States Patent [19]

Koyama et al.

[11] Patent Number: 5,026,598
[45] Date of Patent: Jun. 25, 1991

[54] MAGNETIC RECORDING MEDIUM

[75] Inventors: Noboru Koyama; Yasushi Nakano; Setsuko Kawahara; Noboru Nakajima, all of Hino, Japan

[73] Assignee: Konica Corporation, Tokyo, Japan

[21] Appl. No.: 448,664

[22] Filed: Dec. 11, 1989

[30] Foreign Application Priority Data

Dec. 12, 1988 [JP] Japan ............................... 63-314491

[51] Int. Cl.$^5$ .............................................. G11B 23/00
[52] U.S. Cl. ................................... 428/323; 428/336; 428/408; 428/694; 428/900
[58] Field of Search ............... 428/323, 408, 336, 694, 428/900

[56] References Cited

U.S. PATENT DOCUMENTS

| | | | |
|---|---|---|---|
| 4,259,392 | 3/1981 | Suzuki | 428/900 |
| 4,511,617 | 4/1985 | Hideyama et al. | 428/408 |
| 4,546,038 | 10/1985 | Yamaguchi et al. | 428/694 |
| 4,617,226 | 10/1986 | Yamaguchi et al. | 428/694 |
| 4,626,469 | 12/1986 | Yamaguchi et al. | 428/694 |
| 4,946,740 | 8/1990 | Ono et al. | 428/900 |
| 4,965,120 | 10/1990 | Ono et al. | 428/900 |

OTHER PUBLICATIONS

Patents Abstracts of Japan, vol. 12, No. 136 (p. 694) (2983); 4/26/88, JPA-62-256,219; 11/7/87.
Patent Abstracts of Japan, vol. 13, No. 75 (p. 831) (3423); 2/21/89, JPA-63-259,826; 10/26/88.

Primary Examiner—Paul J. Thibodeau
Attorney, Agent, or Firm—Jordan B. Bierman

[57] ABSTRACT

There is disclosed a magnetic recording medium comprising a support and provided thereon a plurality of layers. The layers comprise an outermost magnetic layer and a lower magnetic layer, wherein the outermost magnetic layer contains carbon black having an average primary particle size ranging from 40 mμ to 300 mμ, and the lower magnetic layer contains carbon black having an average primary particle size ranging from 5 mμ to 30 mμ.

14 Claims, 3 Drawing Sheets

MAGNETIC RECORDING MEDIUM

FIELD OF THE INVENTION

The present invention relates to a magnetic recording medium, such as a magnetic tape, a magnetic sheet or a magnetic disk.

BACKGROUND OF THE INVENTION

In general, a magnetic recording medium, such as a magnetic tape, is produced by coating and drying a magnetic material coating liquid comprising magnetic powder and a binder resin on a support.

In recent years, in a magnetic recording medium, particularly for a shortwavelength video recording, there has been a strong tendency toward the use of a more finely pulverized and more highly magnetized magnetic powder than ever before. Further, it has been prevailing to subject the surface of a magnetic layer or base film to smoothing treatment in order to prevent a spacing loss. The treatment, however, has resulted in increasing the coefficient of friction and deteriorating the runability of the medium to cause trouble such as tape adherence, edge crease, and stick slip. Particularly, the magnetic powder subjected to surface treatment is liable to result in a decreased conductivity and increased surface resistivity. Thus, the medium's runability is further deteriorated and dust is easily attracted to cause dropouts. There are known techniques to use carbon black for raising the individual characteristics of a magnetic recording medium, such as the conductivity, friction (runability), surface characteristics and abrasion resistance, as disclosed in Japanese Patent Examined Publication No. 15052/1981 for the conductivity, Japanese Patent Examined Publication No. 20203/1978 for the abrasion resistance (runability) and Japanese Patent Publication Open to Public Inspection (hereinafter referred to as Japanese patent O.P.I. Publication) No. 51025/1981 for the surface characteristic (electromagnetic convbersion property). Also, there are known other techniques to use carbon black for improving both conductivity and friction characteristics of a magnetic layer, as disclosed in Japanese Patent O.P.I. Publication Nos. 5426/1984 and 16141/1984 and Japanese patent Examined Publication Nos. 20203/1978 and 9041/1979. However, where the conductivity of the magnetic layer is raised and the friction is reduced by these methods, the carbon black content of the layer is increased, which results in inferior dispersibility and stability of a magnetic coating liquid and deteriorated electromagnetic conversion properties due to a relatively reduced magnetic powder content. Furthermore, the adherence between a non-magnetic support and a magnetic layer is also deteriorated, and the binding amount of the binder in the magnetic layer is liable to be insufficient. The above matter tends to increase clogging of a magnetic head, which is caused by peeling of the magnetic layer from the support and dropping of the magnetic powder from the magnetic layer.

On the other hand, there have been proposed mediums which have a plurality of magnetic layers in order to improve and balance the magnetic recording characteristics both in high-frequency and low-frequency regions, as described in Japanese Patent O.P.I. Publication NOs. 172142/1984 and 64901/1976 and Japanese Patent Examined Publication Nos. 2218/1957 and 12937/1981.

SUMMARY OF THE INVENTION

It is an object of the present invention to provide a magnetic recording medium which has excellent electromagnetic conversion properties and makes it possible to reduce a coefficient of kinetic friction, a surface resistivity and dropouts.

The above object of the invention is accomplished by a magnetic recording medium comprising a non-magnetic support having thereon a plurality of layers, wherein the magnetic recording medium contains carbon black having an average primary particle size ranging from 40m$\mu$ to 300m$\mu$ in the outermost magnetic layer, and carbon black having an average primary particle size ranging from 5m$\mu$ to 30m$\mu$ in the magnetic layers other than the outermost layer.

DETAILED DESCRIPTION OF THE INVENTION

Figure 1:
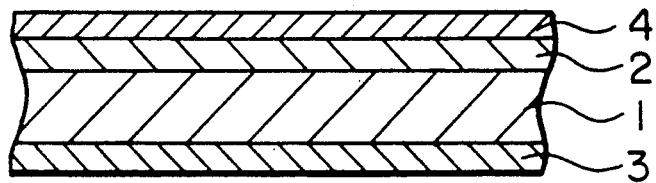
FIG. 1 is a partial cross-sectional view of a magnetic recording medium example of the invention, wherein 1 is a nonmagnetic support, is a first layer (nonconductive lower layer), 3 is a back-coat layer, and 4 is a second layer.

The magnetic recording medium of the invention, as shown in FIG. 1, is of a construction comprising a support 1 made of polyethylene terephthalate having thereon, in sequence, a first layer 2, and a second layer 4. Further, on the side opposite to the layer 2 is provided a backcoat layer (BC layer) 3. Both the first layer 2 and the second layer 4 may be magnetic layers, and the first layer 2 may be a resin layer containing a conductive non-magnetic powder. A subbing layer may be provided between the first layer 2 and the non-magnetic support 1. The non-magnetic support 1 may be subjected to corona discharge treatment. On the second layer 4 may be provided an overcoat layer. The backcoat layer 3 is not always necessary.

In the magnetic recording medium comprising a plurality of magnetic layers according to the invention, the outermost magnetic layer contains carbon black having an average primary particle size of 40$\mu$m to 300$\mu$m and the magnetic layers other than the outermost magnetic layer contain carbon black having an average primary particle size of 5$\mu$m to 30$\mu$m.

Further, highly conductive chromium dioxide ferromagnetic powder is incorporated into the layers other than the outermost layer to form a magnetic layer, and the surface resistivity of the medium can be reduced to $1.0 \times 10^8 \Omega$/sq or lower by the conductivity of the chromium dioxide ferromagnetic powder.

The coefficient of friction of the outermost magnetic layer can be reduced by using carbon black having such a large particle size as above mentioned. Further, the coefficient of friction can be reduced sufficiently without increasing the carbon content because of its large particle size, so that the magnetic powder content of the outermost magnetic layer can be increased to thereby improve the electromagnetic conversion property. The magnetic powder can be dispersed well in a magnetic coating liquid for the outermost magnetic layer because of its less carbon black content, and therefore the binding strength of a binder to the magnetic powder is so strong as to prevent the magnetic powder from dropping out of the magnetic layer and a magnetic head from clogging by the dropped magnetic powder, whereby dropout trouble can be reduced.

The conductivity of carbon black having such a small average particle size as $5m\mu$ to $30m\mu$. which is contained in the magnetic layers other than the outermost magnetic layer, enables to considerably reduce the surface resistivity of the medium because such carbon black generally has a large DBP oil absorption and easily forms a structure construction, which contributes to increasing the conductivity. These features make the medium less liable to stick to a magnetic head and attract dust because of less electrification, which contributes to reduction of dropout and noticeable improvement of runability.

The invention is characterized by providing the different functions to carbon black functions in the outermost magnetic layer and other magnetic layers and integrating the respective functions most efficiently.

If the average primary particle size of the carbon black contained in the outermost magnetic layer exceeds $300m\mu$, the electromagnetic conversion properties are deteriorated. If the average primary particle size of the carbon black contained in the other magnetic layers is smaller than $5m\mu$, the carbon black dispersion is deteriorated, which results in deteriorating the electromagnetic conversion properties by adversely affecting the outermost magnetic layer because of the rough surface of the other magnetic layers.

The average primary particle size of the carbon black contained in the outermost magnetic layer (the magnetic layer 4 in FIG. 1) is preferably 40 to $100m\mu$, and more preferably 40 to $70m\mu$. The carbon black content thereof is preferably 0.1 to 5 parts by weight, and more preferably 0.1 to 3 parts by weight per 100 parts by weight of magnetic powder. Carbon black usable for the outermost magnetic layer includes Asahi #60 ($51m\mu$), Asahi #55 ($77m\mu$), Asahi Thermal ($90m\mu$), Asahi #50 ($94m\mu$) and Asahi #35 ($115m\mu$), produced by Asahi Carbon Black Co.; Dia Black G ($84m\mu$) produced by Mitsubishi Chemical Industry Co.; REGAL SRF-S ($60m\mu$), #22B, #20 and #3500 (all $40m\mu$), and STERLING NS ($75m\mu$), produced by Cabot; and HS 100 ($53m\mu$) produced by Denki Kagaku K.K. These may be used alone or in combination.

The average primary particle size of the carbon black contained in the magnetic layers other than the outermost layer (the lower magnetic layer 2 in FIG. 1) is preferably 5 to $30m\mu$, and more preferably 10 to $25m\mu$. The carbon black content thereof is preferably 1 to 10 parts by weight, and more preferably 1 to 7 parts by weight per 100 parts by weight of magnetic powder. Carbon black for these layers includes Seagal 600 ($23m\mu$), Seast 6H ($24m\mu$), Seast H ($28m\mu$) and Seast 116 ($30m\mu$), produced by Tokai Electric Mfg. Co.; #80 ($23m\mu$) produced by Asahi Carbon Co.; Conductex SC ($17m\mu$), Conductex 975 ($20m\mu$). Conductex 950 ($21m\mu$). Conductex 900 ($27m\mu$) and Conductex 40-220 ($20m\mu$) produced by Columbian Carbon; Dia Black A ($18m\mu$), Dia Black I ($21m\mu$) and Dia Black H ($30m\mu$) produced by Mitsubishi Chemical Industry Co.; Sho Black O ($30m\mu$) produced by Showa Denko K.K.: MONARCH 1300 ($13m\mu$). REGAL 400 ($25m\mu$), VULCAN XC-72 ($30m\mu$), VULCAN P ($20m\mu$), VULCAN 9 ($19m\mu$) and Black Pearls 2000 ($15m\mu$) produced by Cabot. These may be used alone or in combination.

Carbon black may be added in various manners; both fine particles and coarse particles of carbon black may be put into a disperser at the same time to prepare a magnetic liquid, or a part thereof is deposited initially for dispersing to some extent, and then the remainder may be added for further dispersion. Where the dispersion of carbon black is especially important, carbon black is kneaded together with a magnetic material and a binder in a three-roll mill or bambury mixer and then dispersed by a disperser to prepare a magnetic coating liquid. Where the electroconductivity is more important as in the layers other than the outermost magnetic layer, carbon black is added in as later part of the dispersion process or the liquid preparation process as possible so that the structure constitution of the carbon black is not broken.

There may be utilized a so-called carbon master in which carbon black is kneaded with a binder beforehand.

The average primary particle size may be measured either by selectively counting particles through direct electron-microscopic observation or from the particle size distribution obtained by using a laser light, and may also be calculated as a sphere from a specific surface area. For details, reference can be made to the 'CARBON BLACK YEARBOOK 1984' and the 'CARBON BLACK HANDBOOK', both published by Carbon Black Association, and the 'Shin Jikken Kagaku Koza' (New Course of Experimental Chemistry) vol. 18, compiled in 1977 by the Chemical Society, Japan, published from Maruzen.

The coefficient of friction on the surface of the magnetic recording medium is preferably not more than 0.25, and more preferably 0.1 to 0.22. The surface resistivity of the medium is preferably not more than $10^9\Omega$/sq, and more preferably $10^5$ to $10^8\Omega$/sq.

In the magnetic recording medium in FIG. 1, the thickness of the first layer 2 is preferably 1.5 to 3.0 $\mu$m, and that of the second layer 4 is preferably 0.5 to 1.5 $\mu$m.

The magnetic powder for the respective magnetic layers includes $\gamma$-$Fe_2O_3$, $Fe_3O_4$, intermediate products thereof, cobalt-containing iron oxide magnetic powder prepared by doping or coating cobalt atoms to these magnetic iron oxides, ferromagnetic chromium dioxide powder, iron nitride, iron carbide, alloy metal magnetic powder, barium ferrite, and a barium ferrite modified with a metal such as titanium and cobalt.

In the outermost magnetic layer, the specific surface area of the magnetic powder in terms of a BET value is preferably 30 to $60m^2$/g, and more preferably 40 to $60m^2$/g, and the coercive force Hc is preferably 600 to 900 oersteds, and more preferably 700 to 900 oersteds. In the layers other than the outermost magnetic layer, the specific surface area of the magnetic powder in terms of a BET value is preferably 20 to $60m^2$/g, and more preferably 25 to $55m^2$/g, and the coercive force Hc is preferably 600 to 900 oersteds, and more preferably 600 to 800 oersteds.

The above specific surface area, expressed in a BET value, is a surface area per unit weight and is a physical value quite different from an average particle size. For example, there exist particles having a large specific surface area and a small one while each having the same average particle size. Generally, the specific surface area is measured by the B.E.T. method in the following manner; powder is first deaerated to remove adsorbate therefrom by heating to about 250° C. for 30 to 60 minutes; it is put into a measuring instrument at an initial nitrogen pressure set at 0.5 kg/m², and then, the powder is subjected to an adsorption measurement at a liquefied nitrogen temperature of −195° C. Details of the method is described in J. Ame. Chem. Soc. 60 309 (1938).

Non-magnetic conductive powder, which is incorporated into the layers other than the outermost magnetic layer, is added in an amount of preferably 30 to 80 parts by weight per 100 parts by weight of a resin. Examples of the non-magnetic conductive particles include graphite, titanium oxide, zinc oxide, zinc sulfide, magnesium oxide, tin dioxide, cerium oxide, α-iron oxide, molybdenum carbide, boron carbide and barium sulfate.

A binder for the layers of the medium is one having an average molecular weight of about 10,000 to 200,000, including a vinyl chloride-vinyl acetate copolymer, a vinyl chloride-vinylidene chloride copolymer, a vinyl chloride-acrylonitrile copolymer, a urethane resin, a butadiene-acrylonitrile copolymer, a polyamide resin, polyvinyl butyral; cellulose derivatives such as cellulose acetate butyrate, cellulose diacetate, cellulose triacetate, cellulose propionate and nitrocellulose; a styrene-butadiene copolymer, a polyester resin, various synthetic rubbers, a phenol resin, an epoxy resin, a urea resin, a melamine resin, a phenoxy resin, a silicone resin, an acryl-type reaction resin, a mixture of a high-molecular polyester resin and an isocyanate prepolymer, a mixture of a polyester polyol and a polyisocyanate, a urea-formaldehyde resin, a mixture of low-molecular weight glycol, high-molecular weight diol and isocyanate, and a mixture thereof.

The binder is preferably a resin containing a hydrophilic polar group such as $-SO_3M$, $-COOM$ and $-PO(OM')_2$, wherein M is a hydrogen atom or an alkali metal such as lithium, potassium or sodium; M' is a hydrogen atom, an alkali metal such as lithium, potassium and sodium, or a hydrocarbon residue. Such polar groups can provide an improved compatibility with a magnetic powder to the resin, which in turn results in further improving the dispersibility of the magnetic powder and the stability of a coating liquid, whereby the durability of the medium can be improved.

Of these binders, particularly the vinyl chloride copolymer can be prepared by copolymerization of a copolymerizable monomers comprising a vinyl chloride monomer, a monomer containing an alkali metal salt of sulfonic acid or phosphoric acid and, if necessary, other monomers.

The metal of the sulfonic acid or phosphoric acid salt is an alkali metal, particularly sodium, potassium or lithium, and of these metals, potassium is preferable in view of the solubility, reactivity and yield.

Examples of the above monomer containing a sulfonate include:
$CH_2=CHSO_3M$,
$CH_2=CHCH_2SO_3M$,
$CH_2=C(CH_3)CH_2SO_3M$,
$CH_2=CHCH_2OCOCH(CH_2COOR)SO_3M$,
$CH_2=CHCH_2CH(OH)CH_2SO_3M$,
$CH_2=C(CH_3)COOC_2H_4SO_3M$,
$CH_2=CHCOOC_4H_8SO_3M$, and
$CH_2=CHCONHC(CH_3)_2CH_2SO_3M$.

Examples of the monomer containing a phosphate include:
$CH_2=CHCH_2OCH_2CH(OH)CH_2-O-PO_3MY^1$,
$CH_2=CHCONHC(CH_3)_2CH_2-O-PO_3MY^2$,

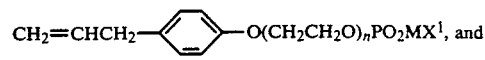

$CH_2=CHCH_2O(CH_2CH_2O)_mPO_2MX^2$, wherein M is an alkali metal; R is an alkyl group having 1 to 20 carbon atoms; $Y^1$ is H, M or $CH_2=CHCH_2OCH_2CH(OH)CH_2-$; $Y^2$ is H, M or $CH_2=CHCONHC(CH_3)_2CH_2-$; $X^1$ is

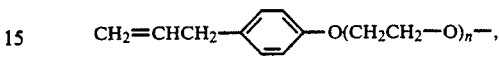

OH or OM; $X^2$ is $CH_2=CHCH_2O(CH_2CH_2O)_m-$, OH or OM; n is an integer of 1 to 100; and m is an integer of 1 to 100.

The monomers which are copolymerized according to necessity include conventional monomers such as vinyl esters, vinylidene chloride, acrylonitrile, methacrylonitrile, styrene, acrylic acid, methacrylic acid, acrylates, methacrylates, ethylene, propylene, isobutene, butadiene, isoprene, vinyl ethers, aryl ethers, aryl esters, acrylamide, methacrylamide, maleic acid, and maleates.

The above binder is synthesized by a polymerization method such as an emulsion polymerization, a solution polymerization, a suspension polymerization and a block polymerization.

The above acid salt-containing monomer content of the binder is preferably 0.01 to 30 mole%. The content, if too high, deteriorates the solubility thereof in a solvent and is liable to cause gelation, while, if too low, cannot provide the prescribed properties.

The above vinyl chloride-type copolymer may additionally contain an epoxy group or a hydroxy group.

A conventional vinyl chloride-type copolymer (e.g., VAGH, produced by U.C.C.) used to comprise the following copolymeric components:

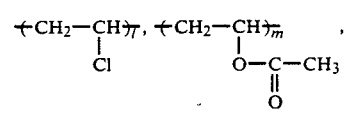

and 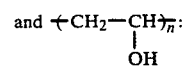

show copolymeric units.

The $CH_3CO-O-$ group is less liable to participate in a cross-linking reaction with a hardener. Accordingly, the copolymer contains preferably an epoxy group such as

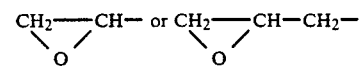

in place of $CH_3CO$. For example, a copolymer having the following units is preferred.

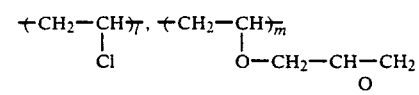

-continued

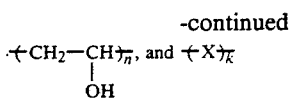

wherein X is a monomer unit containing an alkali metal salt of a sulfo group or a phospho group.

In the magnetic layer, a urethane resin may be used in combination with a vinyl chloride-type resin, an epoxy resin (particularly a phenoxy resin), a polyester resin or a nitrocellulose resin (hereinafter called other resins). The amount of the other resins is preferably 90 to 10 parts by weight, and more preferably 80 to 20 parts by weight per 100 parts by weight of the urethane resin. If the amount exceeds 90 parts by weight, the coat layer becomes frail and the durability thereof as well as the adherence to the support is notably deteriorated. If the amount is less than 10 parts by weight, the magnetic powder is liable to drop from the layer.

Further, in the invention, a polyisocyanate-type hardener may be added to the magnetic layer to improve the layer's durability. Examples of the polyisocyanate-type hardener include bifunctional isocyanates such as tolylene diisocyanate, diphenylmethane diisocyanate, hexane diisocyanate; trifunctional isocyanates such as Coronate L produced by Nippon Polyurethane Industry Co. and Desmodur L produced by Bayer AG: and conventional urethane prepolymers containing isocyanate groups in both terminals thereof and other polyisocyanates usable as hardeners. The polyisocyanate-type hardener is used in an amount of 5 to 80 parts by weight per 100 parts by weight of the binder.

A coating liquid for the layer closest to the non-magnetic support (the first layer 2 in FIG. 1) may not contain any polyisocyanate-type hardener. In the absence of the hardener, the layers' adherence to the nonmagnetic support can be improved.

Each layer provided on the non-magnetic support may contain a fatty acid and/or fatty acid ester as a lubricant. The combined use thereof complements weakness each other while demonstrating the characteristics of both compounds, and the lubrication effect can be improved, which results in improving the still picture durability, running stability and S/N ratio. In this instance, the adding amount of the above fatty acid is preferably 0.2 to 10 parts by weight, and more preferably 0.5 to 8.0 parts by weight per 100 parts by weight of magnetic powder. If the amount of the fatty acid is smaller than the lower limit of the above range, the dispersibility of the magnetic powder is lowered and the runability is liable to be lowered as well, while if the amount is too large, the fatty acid tends to leak out and an output is liable to be lowered. The adding amount of the above fatty acid ester is preferably 0.1 to 10 parts by weight, and more preferably 0.2 to 8.5 parts by weight per 100 parts by weight of magnetic powder. If the amount of the ester is smaller than the lower limit of the above range, it provides less effect for improving the runability, while if the amount is too large, the ester tends to leak out and an output is liable to drop.

For demonstrating furthermore the above effects, the weight ratio of the fatty acid to the fatty acid ester is preferably 10/90 to 90/10. The fatty acid also has a dispersion effect, and it is expected that the addition amount of other low-molecular-weight dispersing agents is reduced, whereby the Young's modulus of the magnetic recording medium can be increased by the reduced amount.

The fatty acid may be either monobasic or dibasic. It has preferably 6 to 30 carbon atoms, and more preferably 12 to 22 carbon atoms. Examples of the fatty acid include:
(1) Caproic acid,
(2) Caprylic acid,
(3) Capric acid,
(4) Lauric acid,
(5) Myristic acid,
(6) Palmitic acid,
(7) Stearic acid,
(8) Isostearic acid,
(9) Linolenic acid,
(10) Linolic acid,
(11) Oleic acid,
(12) Elaidic acid,
(13) Behenic acid,
(14) Malonic acid,
(15) Succinic acid,
(16) Maleic acid,
(17) Glutaric acid,
(18) Adipic acid,
(19) Pimelic acid.
(20) Azelaic acid,
(21) Sebacic acid,
(22) 1,12-dodecanedicarboxylic acid, and
(23) Octanedicarboxylic acid.
Examples of the fatty acid ester include:
(1) Oleyl oleate,
(2) Oleyl stearate,
(3) Isocetyl stearate,
(4) Dioleyl maleate,
(5) Butyl stearate,
(6) Butyl palmitate,
(7) Butyl myristate,
(8) Octyl myristate,
(9) Octyl palmitate,
(10) Amyl stearate,
(11) Amyl palmitate,
(12) Isobutyl oleate,
(13) Stearyl stearate,
(14) Lauryl oleate,
(15) Octyl oleate.
(16) Isobutyl oleate,
(17) Ethyl oleate.
(18) Isotridecyl oleate,
(19) 2-Ethylhexyl stearate,
(20) 2-Ethylhexyl myristate,
(21) Ethyl stearate,
(22) 2-Ethylhexyl palmitate,
(23) Isopropyl palmitate,
(24) Isopropyl myristate,
(25) Butyl laurate,
(26) Cetyl-2-ethyl hexalate,
(27) Dioleyl adipate,
(28) Diethyl adipate,
(29) Diisobutyl adipate, and
(30) Diisodecyl adipate.

Besides the above fatty acids and fatty acid esters, there may be added to the magnetic layer any of other lubricants such as silicone oil and one modified by carboxylic acid or ester; graphite, fluorinated carbon, molybdenum disulfide, tungsten disulfide, fatty acid amide, and $\alpha$-olefin oxide.

Non-magnetic abrasive particles may also be added to the magnetic layer. Examples thereof include $\alpha$-almina, chromium oxide, titanium oxide, $\alpha$-iron oxide, silicon oxide, silicon nitride, silicon carbide, zirconium oxide, zinc oxide, cerium oxide, magnesium oxide or boron nitride. The average particle size of such abraisives is preferably 0.6μm or smaller, and the Mohs scale of the abrasives is preferably 5 or more.

To the magnetic layer may be further added an antistatic agent such as graphite, and a dispersing agent such as powdery recithin and a phosphate.

The non-magnetic particles to be incorporated into the backcoat layer have an average particle size of preferably 10 mμ to 1000mμ. The above particle size range is preferable for demonstrating the effects efficiently.

Examples of the non-magnetic particles include silicon oxide, titanium oxide, alminum oxide, chromium oxide, silicon carbide, calcium carbide, zinc oxide, α-$Fe_2O_3$, talc, kaolin, calcium sulfate, boron nitride, zinc fluoride, molybdenum dioxide, calcium carbide, barium sulfate, and organic powdery materials such as benzoguanamine-type resins, melamine-type resins and phthalocyanine-type pigments. These organic and inorganic powdery materials may be used in combination.

Further, the combined use of the above non-magnetic powder and carbon black is more preferred for stabilizing the runability and improving the durability of the medium synergistically with the non-magnetic powder's action.

EXAMPLES

The present invention is illustrated by making reference to the following examples. The term 'part(s)' used hereinafter is part(s) by weight unless otherwise stated.

EXAMPLE 1

Preparation of a video tape

Firstly, there were prepared the following magnetic coating liquids for the outermost magnetic layer and the conductive lower magnetic layer.

A. Magnetic coating liquid for the outermost layer

| | |
|---|---|
| Co-γ-$Fe_2O_3$ BET value 50 m²/g, Hc 800 Oe | 100 parts |
| $Al_2O_3$ (average particle size 0.2 μm) | 5 parts |
| Carbon black (average particle size and amount described hereinafter) | |
| Sodium sulfonate-containing vinyl chloride resin MR-110 (product of Nippon Geon Co.) | 10 parts |
| Sulfo group-containing polyurethane UR-8300 (product of Toyobo Co.) | 5 parts |
| Myristic acid | 1 part |
| Stearic acid | 1 part |
| Butyl stearate | 0.5 part |
| Cyclohexanone | 100 parts |
| Methylethyl ketone | 100 parts |
| Toluene | 100 parts |

The above magnetic coating material was kneaded and dispersed by a ball mill and a sand mill, and then diluted with solvents (methylethyl ketone, toluene) to an extent of a viscosity of 1 to 20 ps. Then, 5 parts of Coronate L, produced by Nippon Polyurethane Co. were added thereto.

B. Magnetic coating liquid for the conductive lower layer

| | |
|---|---|
| Co-γ-$Fe_2O_3$ BET value 30 m²/g, Hc 700 Oe | 100 parts |
| $Al_2O_3$ (average particle size 0.2 μm) | 5 parts |
| Carbon black (average particle size and amount described hereinafter) | |
| Sodium sulfonate-containing vinyl chloride-vinyl acetate resin MR-110 (product of Nippon Geon Co.) | 10 parts |
| Sulfo group-containing polyurethane UR-8300 (product of Toyobo Co.) | 5 parts |
| Myristic acid | 1 part |
| Stearic acid | 1 part |
| Butyl stearate | 0.5 part |
| Cyclohexanone | 100 parts |
| Methylethyl ketone | 100 parts |
| Toluene | 100 parts |

The above magnetic coating material was kneaded and dispersed by a ball mill and a sand mill, and then diluted with solvents (methylethyl ketone, toluene) to an extent of a viscosity of 1 to 20 ps.

On a 14.5 μm-thick polyethylene terephthalate base film was coated the magnetic coating liquid for the conductive lower layer, and thereon was further coated the magnetic coating liquid for the outermost layer. Then, the layers were subjected to orientation, drying and calender treatment. The dry thickness of the outermost layer was 1.0μm and that of the lower layer was 2.0μm.

After that, a BC layer coating liquid haVing the following composition was coated on the side reverse to the magnetic layers to a dry thickness of 0.4μm.

| | |
|---|---|
| Carbon black (Raven 1035) | 40 parts |
| Barium sulfate, average particle size 300 mμ | 10 parts |
| Nitrocellulose | 25 parts |
| N-2301 (product of Nippon Polyurethane Co.) | 25 parts |
| Coronate L (product of Nippon Polyurethane Co.) | 10 parts |
| Cyclohexanone | 400 parts |
| Methylethyl ketone | 250 parts |
| Toluene | 250 parts |

Thus, a magnetic film bulk web was prepared and slit into ½ inch-wide rolls to prepare video tape samples.

The average primary particle size and the amount of the carbon black used for the outermost and lower magnetic layers were varied as shown in Table 1 to thereby prepare the video tape samples for the invention and comparison, provided that in the sample No. 1 (comparative), on the support was coated only the outermost layer coating liquid containing the two kinds of carbon black shown in Table 1, while in the sample No. 2 (comparative), on the support was coated only the lower layer coating liquid containing the two kinds of carbon black shown in Table 1.

The following characteristics of these video tapes were measured, and the results are shown in Table 1. The measuring methods are as follows:

Average surface roughness of the magnetic layer before calender treatment

The video tape surface before being subjected to calender treatment was measured with a three-dimentional surface roughness meter 3FK, manufactured by Kosaka Research Institute (cutoff 0.25 mm); an index of the dispersibility.

RF output dropping after durability test

RF output dropping was measured after repeating 400 cycles running of the tape corresponding to first five minutes playing.

Surface resistivity

Measured with a surface poentiometer at an applied voltage of 500V.

Coefficient of kinetic friction

Measured at 25° C. with a running tester TBT-300 D made by Yokohama System Laboratory, in which a tape was wound around a chromium-plated 4 $\phi$ pin at 180°, and a tape speed and an inlet tension were set at 1 cm/sec and 20g. respectively. $\mu$k was calculated from the following equation:

$$\mu k = 1/\pi \ln X/20 \text{ (X: an exit tension)}$$

Lumi S/N

Measured with a color video noise meter, Shibasoku 925 D/1.

Dropout

Determined by measuring the whole length of the tape with a drop-out counter VD-5 made by Japan Victor Co. to count the total number of dropouts, and it was converted to an average value per minute, wherein the dropout was defined by an output dropping by 16 dB or more from an output of an RF envelope over a period of 15 $\mu$ sec or longer, which was counted as one dropout.

Running trouble

Observed after repeating 100 cycles running at 40° C. and RH 80%, wherein a 'serious' edge crease means that it was caused over the whole length of the tape and a 'slight' edge crease means that it was caused partially on the tape, especially at the head and end of the tape.

TABLE 1

| Sample No. | | 1* (Comp.) | | 2* (Comp.) | | 1 (Inv.) | 2 (Inv.) | 3 (Inv.) | 3 (Comp.) | 4 (Comp.) | 5 (Comp.) |
|---|---|---|---|---|---|---|---|---|---|---|---|
| Carbon black in the outermost magnetic layer | Average primary particle size (m$\mu$) | 50 | 20 | — | | 50 | 65 | 280 | 30 | 20 | 50 |
| | Parts by weight | 0.5 | 5 | — | | 0.5 | 1 | 0.5 | 1 | 5 | 0.5 |
| Carbon black in the lower magnetic layer | Average primary particle size (m$\mu$) | — | | 50 | 20 | 20 | 15 | 16 | 30 | 50 | 50 |
| | Parts by weight | — | | 0.5 | 5 | 5 | 1 | 2 | 1 | 0.5 | 0.5 |
| Average surface roughness of magnetic layer before calender treatment ($\mu$m) | | 0.020 | | 0.025 | | 0.013 | 0.014 | 0.015 | 0.019 | 0.026 | 0.016 |
| Lumi S/N | | 0.0 | | −0.7 | | +1.2 | +1.0 | +0.9 | −0.1 | −0.8 | +0.2 |
| Chroma S/N | | 0.0 | | −0.6 | | +0.8 | +0.6 | +0.4 | −0.2 | −1.2 | +0.3 |
| Coefficient of kinetic friction | | 0.28 | | 0.26 | | 0.22 | 0.21 | 0.21 | 0.29 | 0.35 | 0.23 |
| RF output dropping after durability test (dB) | | −2.5 | | −2.2 | | −0.5 | −0.7 | −0.6 | −2.8 | −2.6 | −1.2 |
| Surface resistivity ($\Omega$/sq) (applied voltage 500 V) | | $1 \times 10^9$ | | $2 \times 10^9$ | | $1 \times 10^8$ | $2 \times 10^8$ | $4 \times 10^8$ | $2 \times 10^9$ | $1 \times 10^8$ | $6 \times 10^{10}$ |
| Number of dropouts (15 $\mu$s, −16 dB) | | 10 | | 14 | | 0 | 1 | 3 | 13 | 6 | 20 |

| | | Sample No. | 4 (Inv.) | 5 (Inv.) | 6 (Inv.) |
|---|---|---|---|---|---|
| | Carbon black in the outermost magnetic layer | Average primary particle size (m$\mu$) | 40 | 40 | 40 |
| | | Parts by weight | 0.3 | 0.3 | 0.5 |
| | Carbon black in the lower magnetic layer | Average primary particle size (m$\mu$) | 24 | 16 | 20 |
| | | Parts by weight | 7 | 7 | 5 |
| | Average surface roughness of magnetic layer before calender treatment ($\mu$m) | | 0.013 | 0.012 | 0.013 |
| | Lumi S/N | | +1.5 | +1.3 | +0.12 |
| | Chroma S/N | | +0.8 | +0.7 | +0.9 |
| | Coefficient of kinetic friction | | 0.22 | 0.21 | 0.21 |
| | RF output dropping after durability test (dB) | | −0.5 | −0.7 | −0.4 |
| | Surface resistivity ($\Omega$/sq) (applied voltage 500 V) | | $3 \times 10^8$ | $4 \times 10^8$ | $8 \times 10^8$ |
| | Number of dropouts (15 $\mu$s, −16 dB) | | 1 | 1 | 1 |

*Magnetic layer thickness: 4.0 $\mu$m

As is apparent from Table 1, the video tapes for the invention have better electromagnetic conversion properties, fewer dropouts and more excellent runabilities than those of the comparative video tapes. In the samples Nos. 1 and 2 (comparative), the so high carbon black content of the outermost magnetic layer depresses lumi S/N because of the lowered content and dispersibility of the magnetic powder and increases dropout because of attracting more dust, which is attributable to inferior electroconductivity caused by bad dispersion of carbon black. The samples Nos. 3 and 4 (comparative) have larger coefficients of friction, and the sample No. 5 (comparative) has many dropouts attributable to a particularly large surface resistivity.

Figure 2:
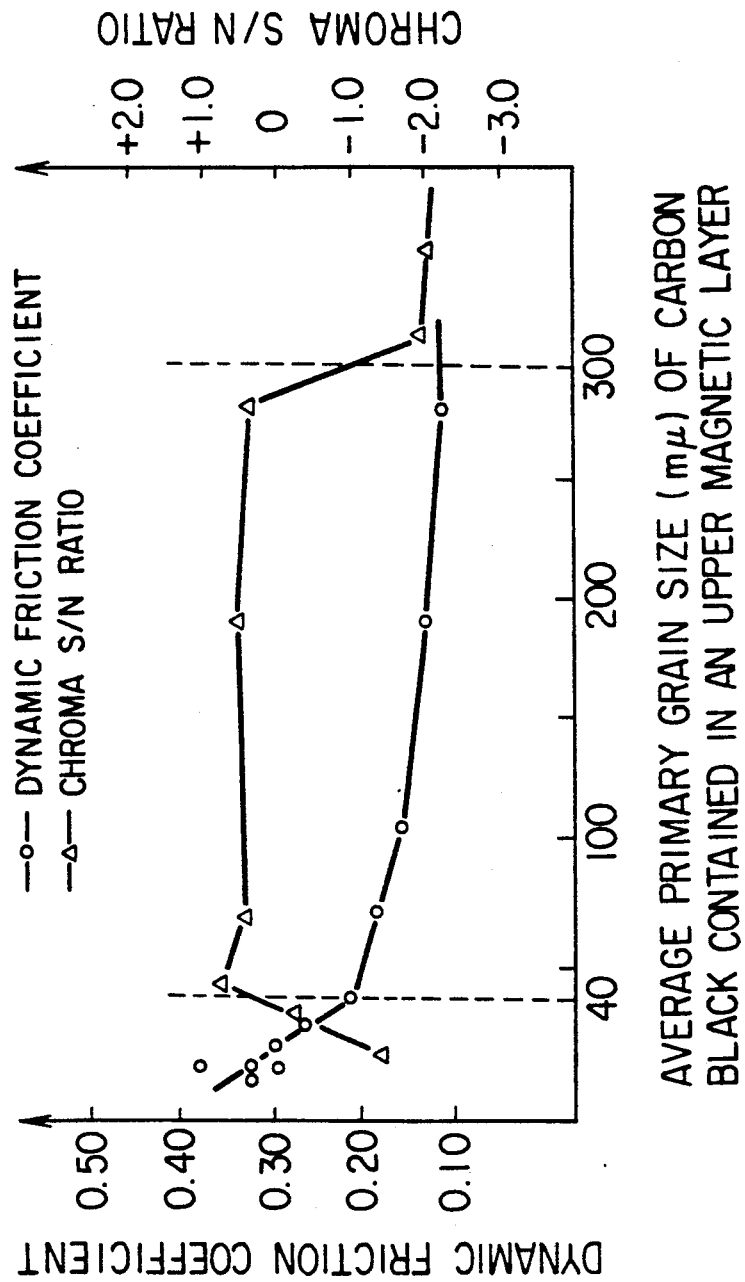
FIG. 2 is a graph showing the relations between the average primary particle size of carbon black in the upper magnetic layer and the video tape characteristics.

There are shown in FIG. 2 the variations of the S/N ratio and the coefficient of kinetic friction vs. the variation of the average primary particle size of carbon black contained in the outermost layer in Example 1.

Figure 3:
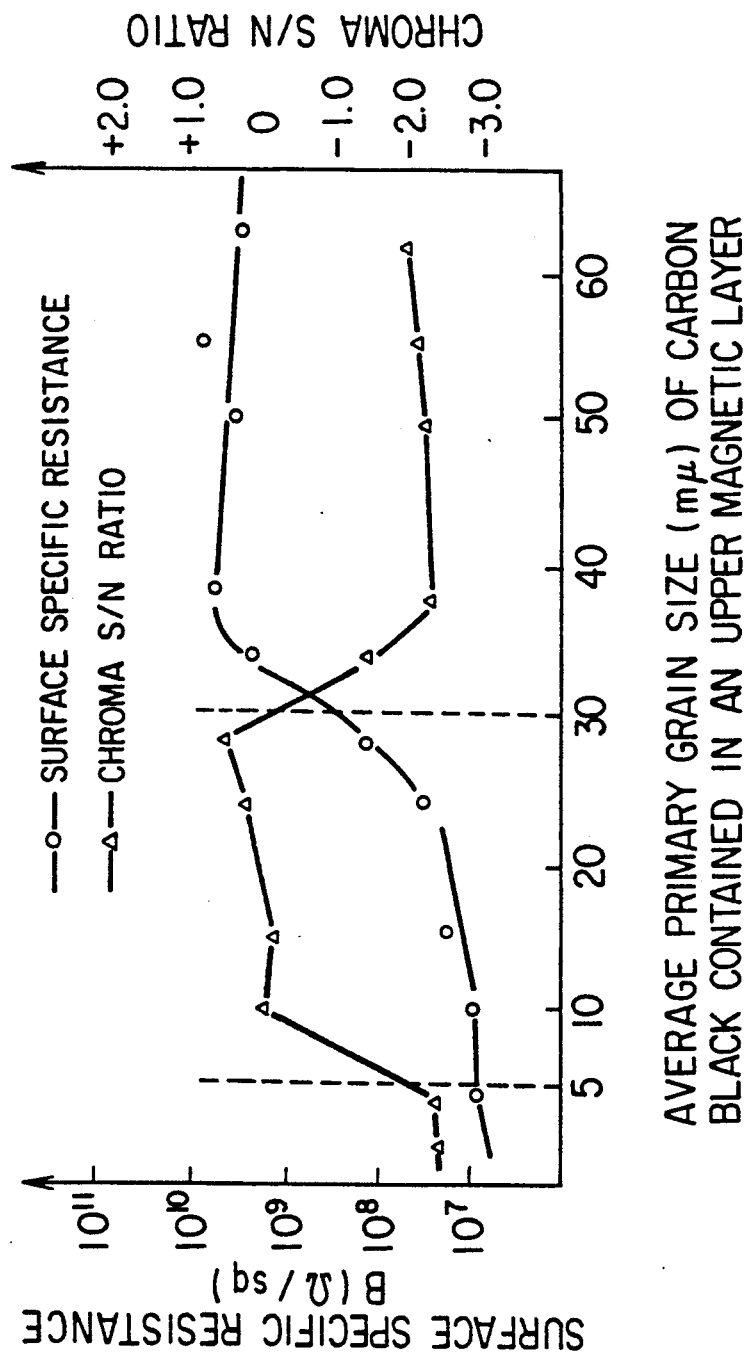
FIG. 3 is a graph showing the relations between the average primary particle size of carbon black in the lower magnetic layer and the video tape characteristics.

There are shown in FIG. 3 as well as the same variations as above vs. the variation of the average primary particle size of carbon black contained in the conductive lower layer.

From the FIG. 2 and FIG. 3, it is understood that the limit value specified in the invention is significant.

What is claimed is:

1. A magnetic recording medium comprising a support and provided thereon a plurality of layers comprising an outermost magnetic layer containing at least a magnetic powder and a binder, and a lower magnetic layer containing at least a magnetic powder and a binder, wherein said outermost magnetic layer contains carbon black having an average primary particle size ranging from 40 m$\mu$ to 300 m$\mu$, and said lower magnetic layer contains carbon black having an average primary particle size ranging from 5 m$\mu$ to 30 m$\mu$; and said outermost layer is coated on said lower layer while the lower layer is in a wet condition.

2. The recording medium of claim 1, wherein said average primary particle size of carbon black contained in the outermost layer ranges from 40 to 100 m$\mu$.

3. The recording medium of claim 2, wherein said average primary particle size ranges from 40 to 70 m$\mu$.

4. The recording medium of claim 1, wherein said average primary particle size of carbon black contained in the lower layer ranges from 10 to 25 m$\mu$.

5. The recording medium of claim 2, wherein a content of said carbon black contained in the outermost layer is 0.1 to 5 weight parts per 100 weight parts of the magnetic powder.

6. The recording medium of claim 5, wherein said content is 0.1 to 3 weight parts per 100 weight parts of the magnetic powder.

7. The recording medium of claim 4, wherein a content of said carbon black contained in the lower layer is 1 to 10 weight parts per 100 weight parts of the magnetic powder.

8. The recording medium of claim 7, wherein said content is 1 to 7 weight parts per 100 weight parts of the magnetic powder.

9. The recording medium of claim 5, wherein a layer thickness of the outermost magnetic layer is 0.5 to 1.5 $\mu$m.

10. The recording medium of claim 7, wherein a layer thickness of the lower layer is 1.5 to 3.0 $\mu$m.

11. The recording medium of claim 1, having a coefficient of dynamic friction of 0.25 or less.

12. The recording medium of claim 11, wherein said coefficient of dynamic friction is 0.15 to 0.22.

13. The recording medium of claim 1, having a surface specific resistance of $1.0 \times 10^8$ $\Omega$/sq or less.

14. The recording medium of claim 13, wherein said surface specific resistance is $1.0 \times 10^5$ to $1 \times 10^8$ $\Omega$/sq.

* * * * *